United States Patent
Hiramatsu et al.

(10) Patent No.: US 8,482,598 B2
(45) Date of Patent: Jul. 9, 2013

(54) STEREOSCOPIC IMAGE DISPLAY APPARATUS, STEREOSCOPIC IMAGE DISPLAYING METHOD AND COMPUTER PROGRAM PRODUCT

(75) Inventors: Koichi Hiramatsu, Nara (JP); Takao Uchimura, Chiba (JP); Yasuhito Suuchi, Kanagawa (JP); Tadanori Okada, Osaka (JP); Kazuyuki Hattori, Aichi (JP); Syunsaku Takeuchi, Aichi (JP)

(73) Assignees: NTT Data Sanyo System Corporation, Moriguchi-Shi (JP); Toyota Jidosha Kabushiki Kaisha, Toyota-Shi (JP)

( * ) Notice: Subject to any disclaimer, the term of this patent is extended or adjusted under 35 U.S.C. 154(b) by 1206 days.

(21) Appl. No.: 11/908,824

(22) PCT Filed: Dec. 12, 2005

(86) PCT No.: PCT/JP2005/022762
§ 371 (c)(1),
(2), (4) Date: Sep. 17, 2007

(87) PCT Pub. No.: WO2006/100805
PCT Pub. Date: Sep. 28, 2006

(65) Prior Publication Data
US 2008/0192112 A1 Aug. 14, 2008

(30) Foreign Application Priority Data
Mar. 18, 2005 (JP) .................................. 2005-080482

(51) Int. Cl.
*H04N 15/00* (2006.01)
*H04N 13/02* (2006.01)
(52) U.S. Cl.
USPC ................................ 348/46; 348/51; 345/419

(58) Field of Classification Search
USPC .................... 349/51, 46; 348/51, 46; 345/419
See application file for complete search history.

(56) References Cited

U.S. PATENT DOCUMENTS

| | | | | |
|---|---|---|---|---|
| 5,170,347 | A * | 12/1992 | Tuy et al. | 345/419 |
| 6,175,379 | B1 | 1/2001 | Uomori et al. | |
| 2003/0095178 | A1* | 5/2003 | Shibayama | 348/46 |

FOREIGN PATENT DOCUMENTS

| | | |
|---|---|---|
| EP | 1168852 | 1/2002 |
| EP | 1489857 | 12/2004 |
| JP | 08-191462 A | 7/1996 |
| JP | 9-74573 A | 3/1997 |
| JP | 11-178012 A | 7/1999 |

(Continued)

*Primary Examiner* — Kyung H Shin
(74) *Attorney, Agent, or Firm* — Leason Ellis LLP.

(57) ABSTRACT

A stereoscopic image display apparatus which can accurately visually recognize all the regions of a stereoscopic image without using a varifocal lens, and can form a natural three-dimensional image on a retina with a processing load on a computer eased even if an image is viewed by a plurality of viewers from any positions. A stereoscopic image display apparatus for generating a stereoscopic image that forms three-dimensional image on a retina of a viewer and displaying it, wherein a critical parallax that is the boundary of parallax capable of forming a three-dimensional image on a retina of a viewer is calculated, the dimensions of rectangular parallelepiped inscribing a sphere having a diameter as the calculated critical parallax are calculated, a space including an object is divided into a plurality of spaces using the calculated rectangular parallelepiped, a stereoscopic image of the object with respect to a single gazing point is generated for each divided space, and the plurality of generated stereoscopic images are pasted together to generate a single stereoscopic image and display the generated single stereoscopic image.

15 Claims, 18 Drawing Sheets

FOREIGN PATENT DOCUMENTS

| | | |
|---|---|---|
| JP | 11-513129 A | 11/1999 |
| JP | 3064992 B2 | 5/2000 |
| JP | 2001-238229 A | 8/2001 |
| JP | 2003-284093 A | 10/2003 |
| JP | 3568195 B2 | 6/2004 |
| WO | 96/41227 A1 | 12/1996 |
| WO | 03/081921 A1 | 10/2003 |
| WO | WO 2004049736 A1 * | 6/2004 |

* cited by examiner

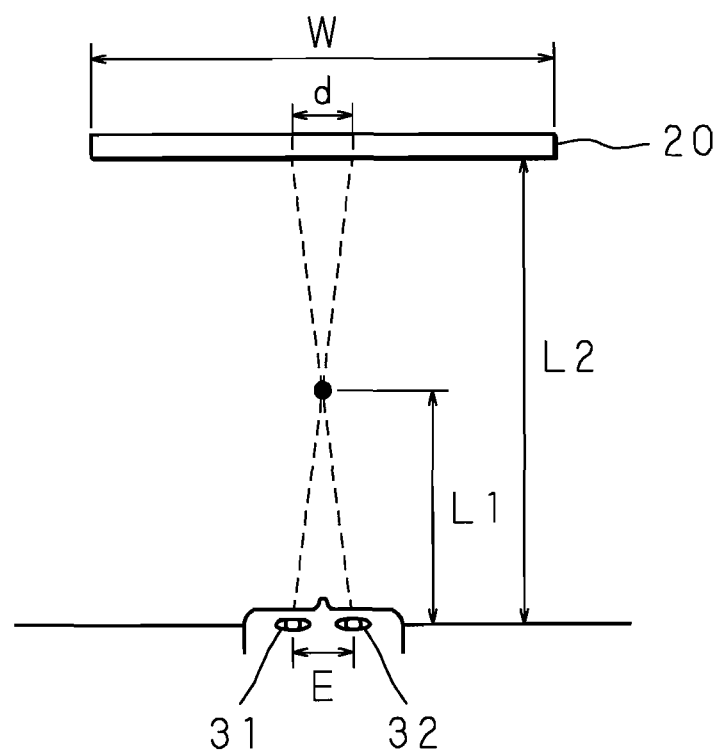
F I G. 3

FIG. 8
(a) 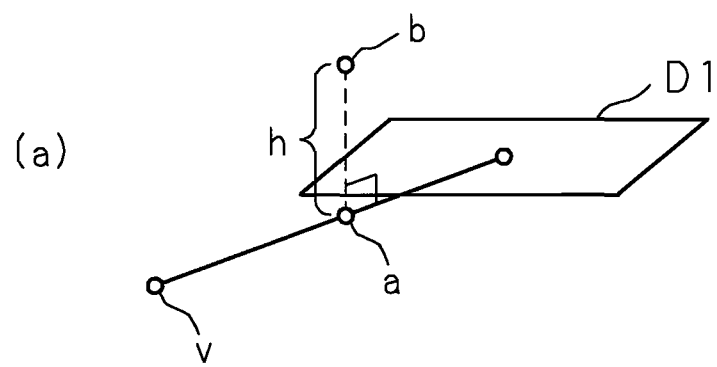
(b) 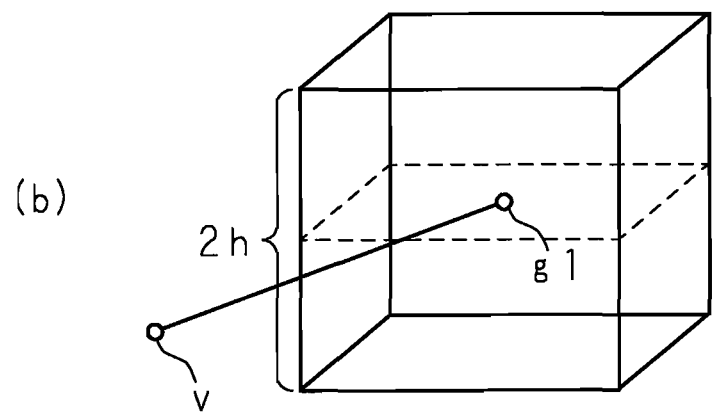

F I G. 9
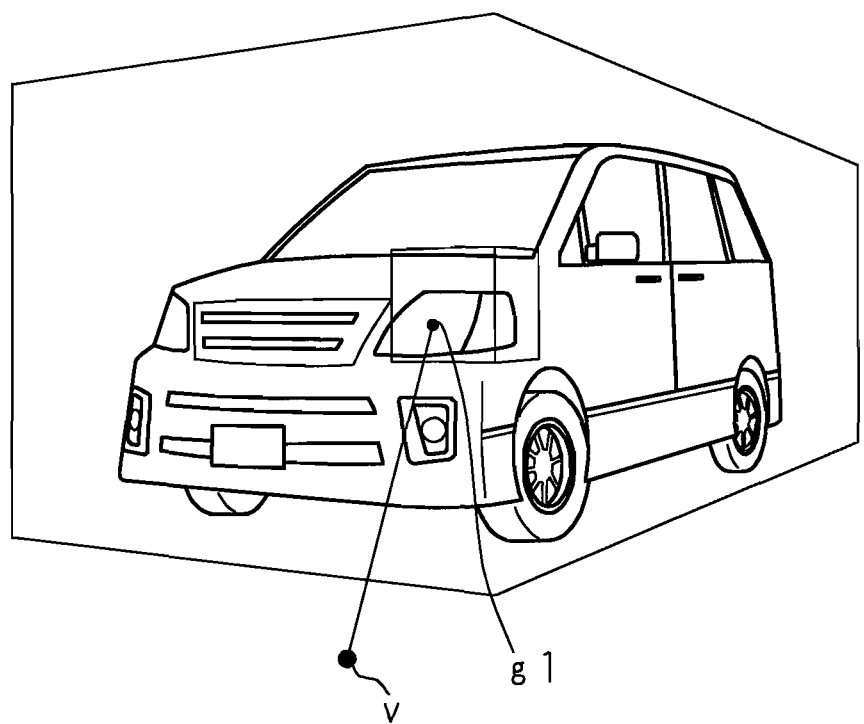

F I G. 1 3
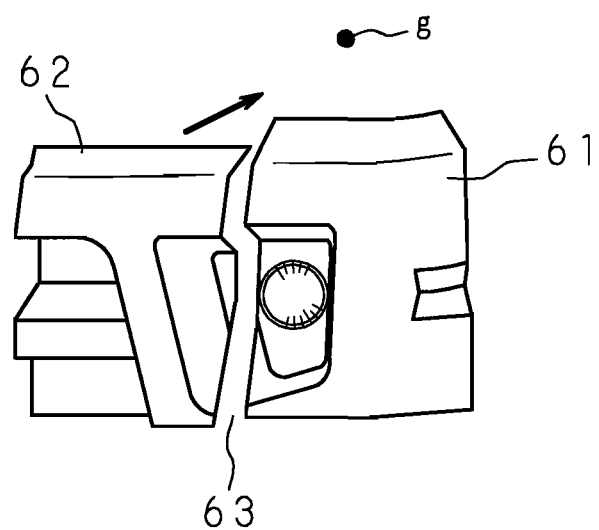

F I G. 16
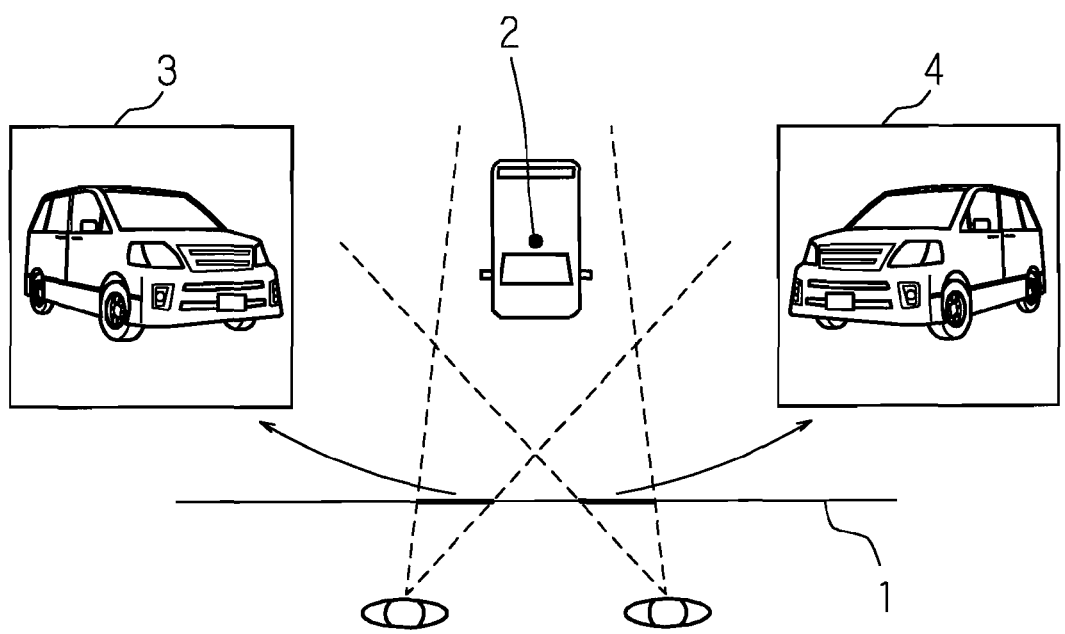

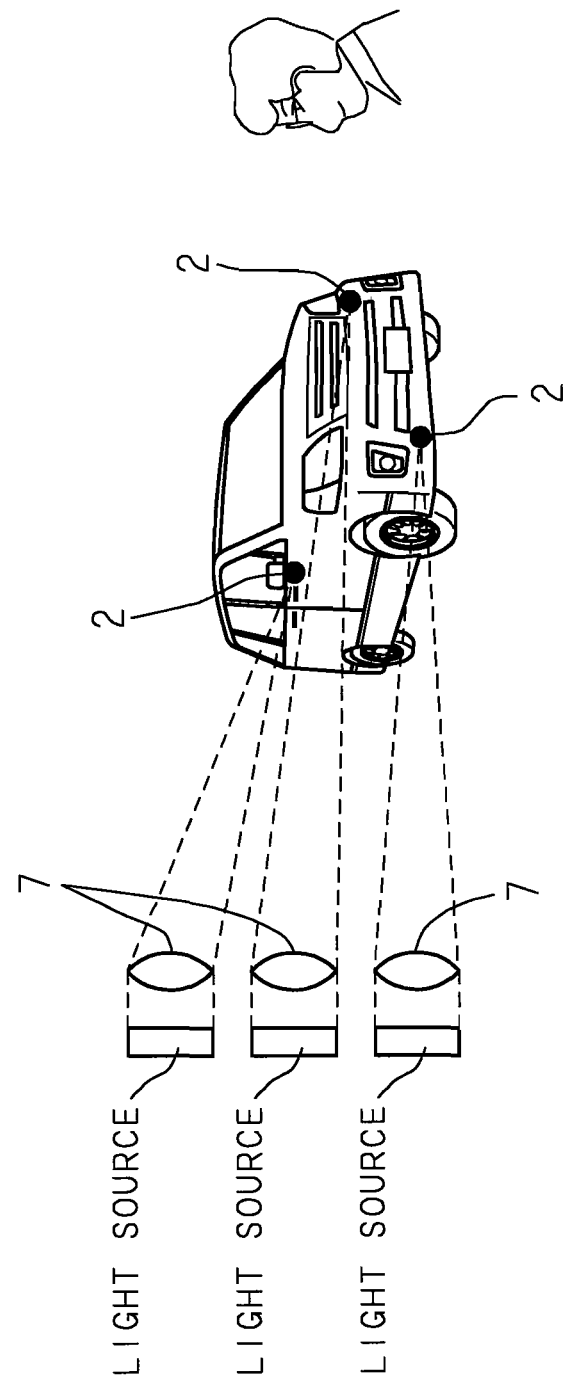

STEREOSCOPIC IMAGE DISPLAY APPARATUS, STEREOSCOPIC IMAGE DISPLAYING METHOD AND COMPUTER PROGRAM PRODUCT

CROSS-REFERENCE TO RELATED APPLICATION

This application is the national phase under 35 U.S.C. §371 of PCT International Application No. PCT/JP2005/022762, which has an international filing date of Dec. 12, 2005 and designated the United States of America.

TECHNICAL FIELD

The present invention relates to a stereoscopic image display apparatus, a stereoscopic image displaying method and a computer program product for generating and displaying a stereoscopic image, capable of forming a three-dimensional image on a retina regardless of the viewing position of a viewer and capable of allowing the viewer to naturally grasp the spatial positional relationship of an object by using the parallax between the eyes of the viewer.

BACKGROUND ART

With the rapid progress of image processing technology in recent years, not only stereoscopic image display apparatuses that generate stereoscopic images viewers can enjoy using special glasses having optical lenses, such as polarized lenses, but also stereoscopic image display apparatuses that generate stereoscopic images viewers can enjoy with the naked eyes are being developed in large quantities. In such conventional stereoscopic image display apparatuses, a stereoscopic image with respect to a single focus point is generated and displayed. Since some regions of a space can be recognized clearly, the spatial positional relationship can be recognized accurately. However, other regions are recognized as the so-called blurred images, and there occurs a problem of being difficult to accurately recognize the positional relationship in the entire region of the space.

FIG. 16 is a schematic view showing the concept of a conventional stereoscopic image display system. When a viewer sees the focus point 2 of a projected object (a vehicle in FIG. 16) via a screen 1 to which a stereoscopic image is projected, the stereoscopic image can be recognized clearly since no parallax occurs at the focus point 2. On the other hand, in the case of a stereoscopic image away from the focus point 2, as the parallax is larger, the divergence between the three-dimensional image 3 formed on the left retina and the three-dimensional image 4 formed on the right retina becomes larger, and the stereoscopic image is eventually recognized in a blurred state. FIG. 17 is a view showing regions in which image blurring occurs in the conventional stereoscopic image display system. As shown in FIG. 17, in the conventional stereoscopic image display system, fixed focal length lenses 5, 5, . . . are used, and the object near the focus point 2 can be recognized clearly. However, in regions away from the focus point 2, for example, in hatched regions 6, the parallax between the left and right images is larger than a predetermined value, and images are recognized as blurred images.

For the purpose of solving these problems, for example, in Japanese Patent No. 3064992 and Japanese Patent Application Laid-open No. 2001.238229, focus points are provided at multiple different positions between the viewer and the screen 1 using varifocal lenses, and the regions in which images can be visually recognized clearly are extended, whereby differences in the way how a stereoscopic image is seen depending on the differences in the position of the viewer, the focus point, etc. are equalized. FIG. 18 is a view showing regions in which image blurring occurs in a stereoscopic image display system incorporating varifocal lenses. As shown in FIG. 18, multiple focus points 2, 2, . . . , can be provided by using the varifocal lenses 7, 7, . . . . Furthermore, the hatched regions 6 in FIG. 17, that is, the regions in which the parallax between the right and left images is larger than the predetermined value and images are recognized as blurred images, can be reduced or eliminated by using the multiple varifocal lenses 7, 7, . . . and by ingeniously disposing the focus points 2, 2, . . . .

SUMMARY

However, for the purpose of completely eliminating the regions in which images are blurred in the stereoscopic image display system incorporating the above-mentioned varifocal lenses 7, 7, . . . , it is necessary to provide the varifocal lenses 7 in large quantities, and there is a problem of increasing cost.

Furthermore, even if the varifocal lenses 7 are provided in large quantities, for example, in the case of an image of an object being present at a position away from any focus points, the parallax between the right and left images becomes larger than the predetermined value at any focus points, and the image is recognized as a blurred image. For this reason, even when the viewer frequently changes his/her viewer's point to grasp the spatial positional relationship of the object, the images can only be recognized as blurred images, and there is a problem of being unable to completely eliminate regions wherein images are recognized as blurred images.

This problem is caused by the fact that the limit value of the parallax (hereafter referred to as critical parallax) within which the viewer can recognize a stereoscopic image without blurring is not considered in the conventional stereoscopic image display system. The critical parallax can be obtained on the basis of the positional relationship between the viewer and the screen.

In addition, in the conventional stereoscopic image display system, comparison judgment processing must be carried out for all the pixels included in an image so that the image being most sharply focused is extracted from multiple photographed images. In other words, the degrees of correlation are calculated for all the pixels, and the parallaxes are calculated. Then, the calculated parallaxes must be compared among multiple images, whereby there causes a problem that the load for computer processing becomes enormous.

Accordingly, an object of the present invention is to provide a stereoscopic image display apparatus, a stereoscopic image displaying method and a computer program product capable of allowing a viewer to visually recognize all the regions of a stereoscopic image accurately without using varifocal lenses and capable of reducing the load for computer processing.

Another object of the present invention is to provide a stereoscopic image display apparatus, a stereoscopic image displaying method and a computer program product capable of calculating a critical parallax as accurately as possible and forming a natural three-dimensional image on a retina even if a stereoscopic image is viewed by multiple viewers from any positions.

In order to attain the above-mentioned objects, a stereoscopic image display apparatus according to a first aspect is characterized by a stereoscopic image display apparatus for generating and displaying a stereoscopic image that forms a three-dimensional image on a retina of a viewer, characterized by comprising:

critical parallax calculating means for calculating a critical parallax that is the boundary of a parallax capable of forming a three-dimensional image on a retina of the viewer;

rectangular parallelepiped dimension calculating means for calculating the dimensions of a rectangular parallelepiped inscribing a sphere having a diameter equal to the calculated critical parallax;

space dividing means for dividing a space including an object into multiple spaces using the calculated rectangular parallelepiped;

focus point image generating means for generating a stereoscopic image of the object with respect to a single focus point for each divided space;

focus point image pasting means for pasting the generated multiple stereoscopic images together to generate a single stereoscopic image; and image displaying means for displaying the generated single stereoscopic image.

In addition, a stereoscopic image display apparatus according to a second aspect is characterized by The stereoscopic image display apparatus, characterized by comprising relative position detecting means for detecting the relative position between the screen on which a stereoscopic image is displayed and the viewer, wherein said critical parallax is calculated as a parallax in which the difference between the inverse of the distance from the point at which the optical axes of the right and left eyes intersect to the eyes and the inverse of the distance from the screen on which the stereoscopic image is displayed to the eyes has a predetermined value, in the first aspect.

Furthermore, a stereoscopic image display apparatus according to a third aspect is characterized by the stereoscopic image display apparatus, characterized in that said critical parallax calculating means is equipped with correcting means for correcting said critical parallax on the basis of the personal characteristics of the viewer, in the first or second aspect.

Moreover, a stereoscopic image display apparatus according to a fourth aspect is characterized by the stereoscopic image display apparatus, characterized in that said focus point image pasting means comprises:

means for calculating the brightness difference, that is, by using one space of the divided spaces as a reference, the difference between the brightness value of a stereoscopic image generated in said one space and the brightness value of a stereoscopic image generated in another space adjacent thereto;

means for moving the other space in parallel with said one space and for recalculating the brightness difference; and means for obtaining the relative position of the other space with respect to said one space, at which the calculated brightness difference becomes minimal, in any one of the first through third aspects.

Still further, a stereoscopic image displaying method according to a fifth aspect is characterized by a stereoscopic image displaying method for generating and displaying a stereoscopic image that forms a three-dimensional image on a retina of a viewer, characterized by comprising:

calculating a critical parallax that is the boundary of a parallax capable of forming a three-dimensional image on a retina of the viewer;

calculating the dimensions of a rectangular parallelepiped inscribing a sphere having a diameter equal to the calculated critical parallax;

dividing a space including an object into multiple spaces using the calculated rectangular parallelepiped;

generating a stereoscopic image of the object with respect to a single focus point for each divided space;

pasting the generated multiple stereoscopic images together to generate a single stereoscopic image; and displaying the generated single stereoscopic image.

Still further, a stereoscopic image displaying method according to a sixth aspect is characterized by the stereoscopic image displaying method, characterized by comprising:

detecting the relative position between the screen on which a stereoscopic image is displayed and the viewer, wherein said critical parallax is calculated as a parallax in which the difference between the inverse of the distance from the point at which the optical axes of the right and left eyes intersect to the eyes and the inverse of the distance from the screen on which the stereoscopic image is displayed to the eyes has a predetermined value, in the fifth aspect.

Still further, a stereoscopic image displaying method according to a seventh aspect is characterized by the stereoscopic image displaying method, characterized in that said critical parallax is corrected on the basis of the personal characteristics of the viewer, in the fifth or sixth aspect.

Still further, a stereoscopic image displaying method according to an eighth aspect is characterized by the stereoscopic image displaying method, characterized by comprising:

calculating the brightness difference, that is, by using one space of the divided spaces as a reference, the difference between the brightness value of a stereoscopic image generated in said one space and the brightness value of a stereoscopic image generated in another space adjacent thereto;

moving the other space in parallel with said one space and recalculating the brightness difference; and obtaining the relative position of the other space with respect to said one space, at which the calculated brightness difference becomes minimal, in any one of the fifth through seventh aspects.

Still further, a computer program according to a ninth aspect is characterized by A computer program for generating and displaying a stereoscopic image that forms a three-dimensional image on a retina of a viewer, characterized in that said computer is operated to function as:

critical parallax calculating means for calculating a critical parallax that is the boundary of a parallax capable of forming a three-dimensional image on a retina of the viewer;

rectangular parallelepiped dimension calculating means for calculating the dimensions of a rectangular parallelepiped inscribing a sphere having a diameter equal to the calculated critical parallax;

space dividing means for dividing a space including an object into multiple spaces using the calculated rectangular parallelepiped;

focus point image generating means for generating a stereoscopic image of the object with respect to a single focus point for each divided space;

focus point image pasting means for pasting the generated multiple stereoscopic images together to generate a single stereoscopic image; and image displaying means for displaying the generated single stereoscopic image.

Still further, a computer program according to a 10th aspect is characterized by the computer program, characterized in that said computer is operated:

to function as relative position detecting means for detecting the relative position between the screen on which a stereoscopic image is displayed and the viewer, and to function such that said critical parallax is calculated as a parallax in which the difference between the inverse of the distance from the point at which the optical axes of the right and left eyes intersect to the eyes and the inverse of the distance from the screen on which the stereoscopic image is displayed to the eyes has a predetermined value, in the ninth aspect.

Still further, a computer program according to an 11th aspect is characterized by the computer program, characterized in that said computer is operated to function as correcting means for correcting said critical parallax on the basis of the personal characteristics of the viewer, in the ninth or 10th aspect.

Still further, a computer program according to a 12th aspect is characterized by the computer program, characterized in that said computer is operated to function as:

means for calculating the brightness difference, that is, by using one space of the divided spaces as a reference, the difference between the brightness value of a stereoscopic image generated in said one space and the brightness value of a stereoscopic image generated in another space adjacent thereto;

means for moving the other space in parallel with said one space and for recalculating the brightness difference; and means for obtaining the relative position of the other space with respect to said one space, at which the calculated brightness difference becomes minimal, in any one of the ninth through 11th aspects.

In the first, fifth and ninth aspects, a critical parallax that is the boundary of the parallax capable of forming a three-dimensional image on a retina of a viewer is calculated, the dimensions of a rectangular parallelepiped within the range of the calculated critical parallax are calculated, a space including an object is divided into multiple spaces using the calculated rectangular parallelepiped, a stereoscopic image of the object with respect to a single focus point is generated for each divided space including the object, and the generated multiple stereoscopic images are pasted together to generate a single stereoscopic image and to display and output the single stereoscopic image. With this configuration, a space is divided using a rectangular parallelepiped within the range of the parallax wherein the viewer does not recognize an image as a blurred image, a stereoscopic image is generated for each divided space in a way similar to the conventional method, and then these images are pasted together to generate a stereoscopic image. Therefore, the generated stereoscopic image is a stereoscopic image within the range of the critical parallax in any regions thereof, and no blurred three-dimensional image is formed on a retina even if the stereoscopic image is viewed by the viewer from any positions and any angles.

Hence, all the regions of the stereoscopic image can be visually recognized accurately without using varifocal lenses, and the spatial positional relationship of the object can be grasped accurately. In addition, since image generation can be done simply by pasting only the stereoscopic images each generated in a space having the shape of a rectangular parallelepiped in which the object is present. As a result, the load for computer processing can be decreased significantly, and the cost for computation can be reduced.

In the second, sixth and 10th aspects, relative position detecting means for detecting the relative position between a screen on which a stereoscopic image is displayed and a viewer is provided, and the critical parallax is calculated as a parallax in which the difference between the inverse of the distance from the point at which the optical axes of the right and left eyes intersect to the eyes and the inverse of the distance from the screen on which the stereoscopic image is displayed to the eyes has a predetermined value. Hence, the critical parallax can be calculated accurately depending on the viewing position of the viewer, whereby it is possible to display a stereoscopic image adapted to the viewer.

In the third, seventh and 11th aspects, correcting means for correcting the critical parallax on the basis of the personal characteristics of a viewer is provided. With this configuration, the calculated critical parallax is corrected depending on the personal characteristics of the viewer, such as focusing in front of or behind the retina position due to nearsightedness or farsightedness or the presence or absence of dirt on the crystalline lens, whereby the critical parallax can be calculated more accurately, and it is possible to display a stereoscopic image more adapted to the viewer.

In the fourth, eighth and 12th aspects, by using one space of the divided spaces as a reference, the brightness difference, that is, the difference between the brightness value of a stereoscopic image generated in this one space and the brightness value of a stereoscopic image generated in another space adjacent thereto is calculated, the other space is moved in parallel with the one space and the brightness difference is recalculated, and the relative position of the other space with respect to the one space, at which the calculated brightness difference becomes minimal, is obtained. With this configuration, the gap portion, such as a transparent portion being generated at the boundary of the adjacent stereoscopic images when the stereoscopic images are simply pasted at their original space positions, can be eliminated. Hence, it is possible to generate a stereoscopic image that can form a natural three-dimensional image on a retina of the viewer even at the boundary portion.

In the first, fifth and ninth aspects, a space is divided using a rectangular parallelepiped within the range of the parallax wherein the viewer does not recognize an image as a blurred image, a stereoscopic image is generated for each divided space in a way similar to the conventional method, and then these images are pasted together to generate a stereoscopic image. Therefore, the generated stereoscopic image is a stereoscopic image within the range of the critical parallax in any regions thereof, and no blurred three-dimensional image is formed on a retina even if the stereoscopic image is viewed by the viewer from any positions and any angles.

Hence, all the regions of the stereoscopic image can be visually recognized accurately without using varifocal lenses, and the spatial positional relationship of the object can be grasped accurately. In addition, since image generation can be done simply by pasting only the stereoscopic images each generated in a space having the shape of a rectangular parallelepiped in which the object is present. As a result, the load for computer processing can be decreased significantly, and the cost for computation can be reduced.

In the second, sixth and 10th aspects, the critical parallax can be calculated accurately depending on the viewing position of the viewer, whereby it is possible to display a stereoscopic image adapted to the viewer.

In the third, seventh and 11th aspects, the calculated critical parallax is corrected depending on the personal characteristics of the viewer, such as focusing in front of or behind the retina position due to nearsightedness or farsightedness or the presence or absence of dirt on the crystalline lens, whereby the critical parallax can be calculated more accurately, and it is possible to display a stereoscopic image more adapted to the viewer.

In the fourth, eighth and 12th aspects, the gap portion, such as a transparent portion being generated at the boundary of the adjacent stereoscopic images when the stereoscopic images are simply pasted at their original space positions, can be eliminated. Hence, it is possible to generate a stereoscopic image that can form a natural three-dimensional image on a retina of the viewer even at the boundary portion.

BRIEF DESCRIPTION OF THE DRAWINGS

FIG. 3 is a view illustrating a critical parallax;

FIGS. 8(a) and 8(b) are schematic views showing a method for obtaining the height and width of a rectangular parallelepiped for the first divided space;

FIG. 9 is a view showing a state wherein the first divided space is disposed;

FIG. 13 is a schematic view showing a state in which a stereoscopic image to be adjusted is moved dot by dot;

FIG. 16 is a schematic view showing the concept of the conventional stereoscopic image display system;

FIG. 18 is a view showing regions in which image blurring occurs in the stereoscopic image display system incorporating varifocal lenses.

EXPLANATION OF THE REFERENCE NUMERALS

Figure 1:
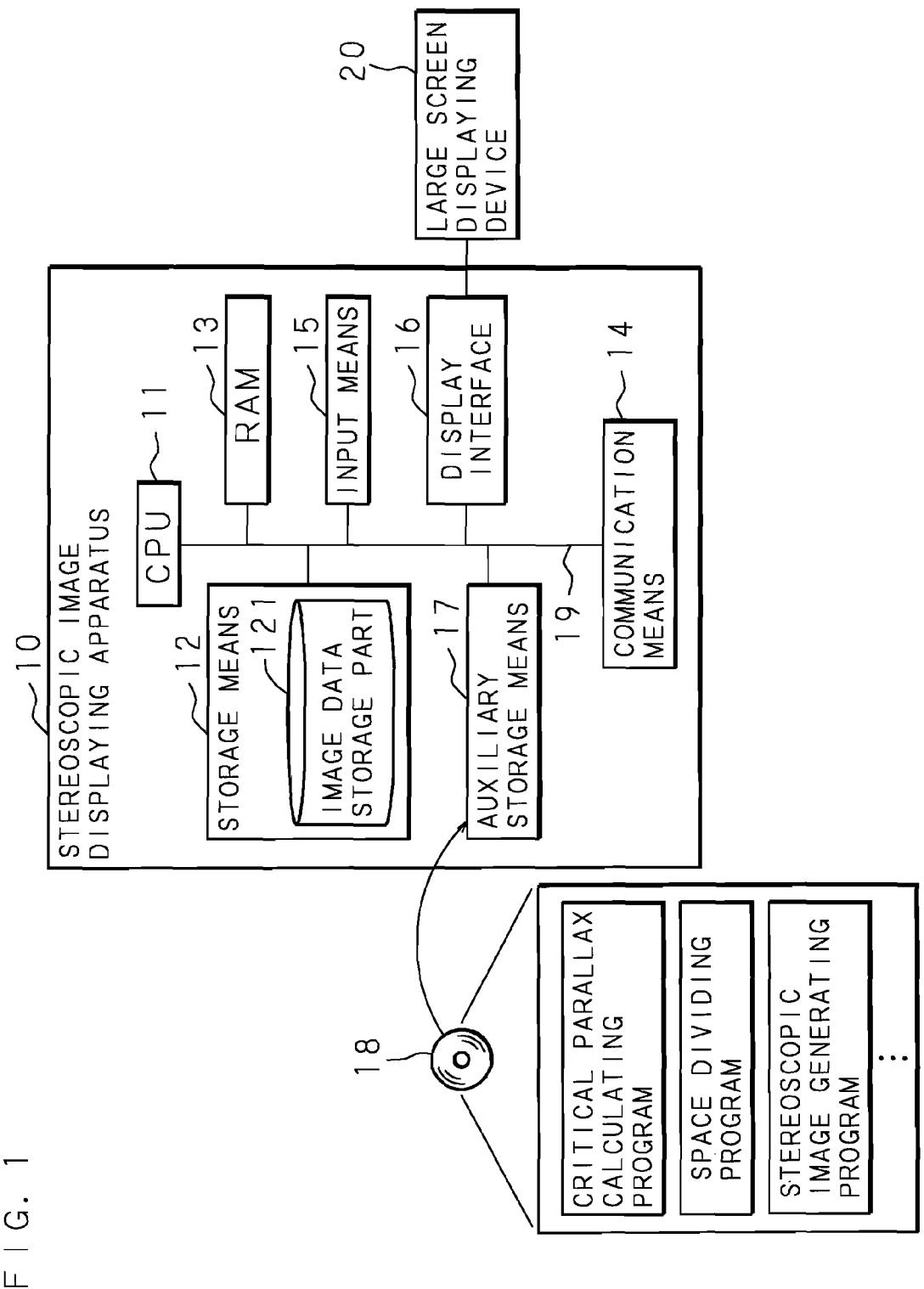
FIG. 1 is block diagram showing the configuration of a stereoscopic image display apparatus according to Embodiment 1 of the present invention.

10 Stereoscopic image display apparatus
11 CPU
12 Storage means
13 RAM
14 Communication means
15 Input means
16 Display interface
17 Auxiliary storage means
18 Portable recording media
20 Large screen display unit
30 Display unit
40 Viewer sensor
41 Sensor interface
121 Image data storage section
D Critical parallax
g, g1, g2, . . . , gn Focus points

DETAILED DESCRIPTION

Embodiment 1

A stereoscopic image display apparatus according to Embodiment 1 of the present invention will be described below specifically on the basis of the drawings. FIG. 1 is a block diagram showing the configuration of the stereoscopic image display apparatus 10 according to Embodiment 1 of the present invention. As shown in FIG. 1, the stereoscopic image display apparatus 10 comprises at least a CPU (central processing unit) 11, storage means 12, a RAM 13, communication means 14 for communicating with an external network, such as Internet, input means 15, a display interface 16 for outputting display image data to an external large screen display unit 20 that can be viewed by multiple viewers, and auxiliary storage means 17 that use portable recording media 18, such as DVDs and CDs.

The CPU 11 is connected to the above-mentioned hardware devices of the stereoscopic image display apparatus 10 via an internal bus 19, controls the above-mentioned hardware devices, and executes various software functions according to processing programs stored in the storage means 12, such as a program for calculating a critical parallax, a program for dividing a space using a rectangular parallelepiped within the range of the critical parallax, a program for generating a stereoscopic image of an object with respect to a single focus point, and a program for pasting multiple stereoscopic images together.

The storage means 12 comprises a fixed storage device (hard disk), a ROM, etc. being built therein, and stores processing programs obtained from an external computer via the communication means 14 or the portable storage media 18, such as DVDs and CD-ROMs and required for allowing a display unit to function as the stereoscopic image display apparatus 10. The storage means 12 stores not only the processing programs but also, for example, the image data obtained by photographing objects and received from an external computer, in the image data storage section 121 thereof.

The RAM 13 is formed of a DRAM or the like and stores temporary data generated while the software is executed. The communication means 14 is connected to the internal bus 19. When connected so as to be able to communicate with a network, such as Internet or LAN, the communication means 14 transmits and receives data required for the processing.

The input means 15 is a pointing device, such as a mouse, for indicating a position on the screen or a keyboard for key entering numeric data, such as the horizontal width of the screen on the screen.

The display interface 16 is an LSI board for transmitting display data to the external large screen display unit 20, such as a liquid crystal display device (LCD) or a display device (CRT), for displaying images.

The auxiliary storage means 17 uses the portable recording means 18, such as CDs and DVDs. Programs, data, etc., to be processed by the CPU 11, are downloaded to the storage means 12 using the auxiliary storage means 17. In addition, data processed by the CPU 11 can be written for backup using the auxiliary storage means 17.

Figure 2:
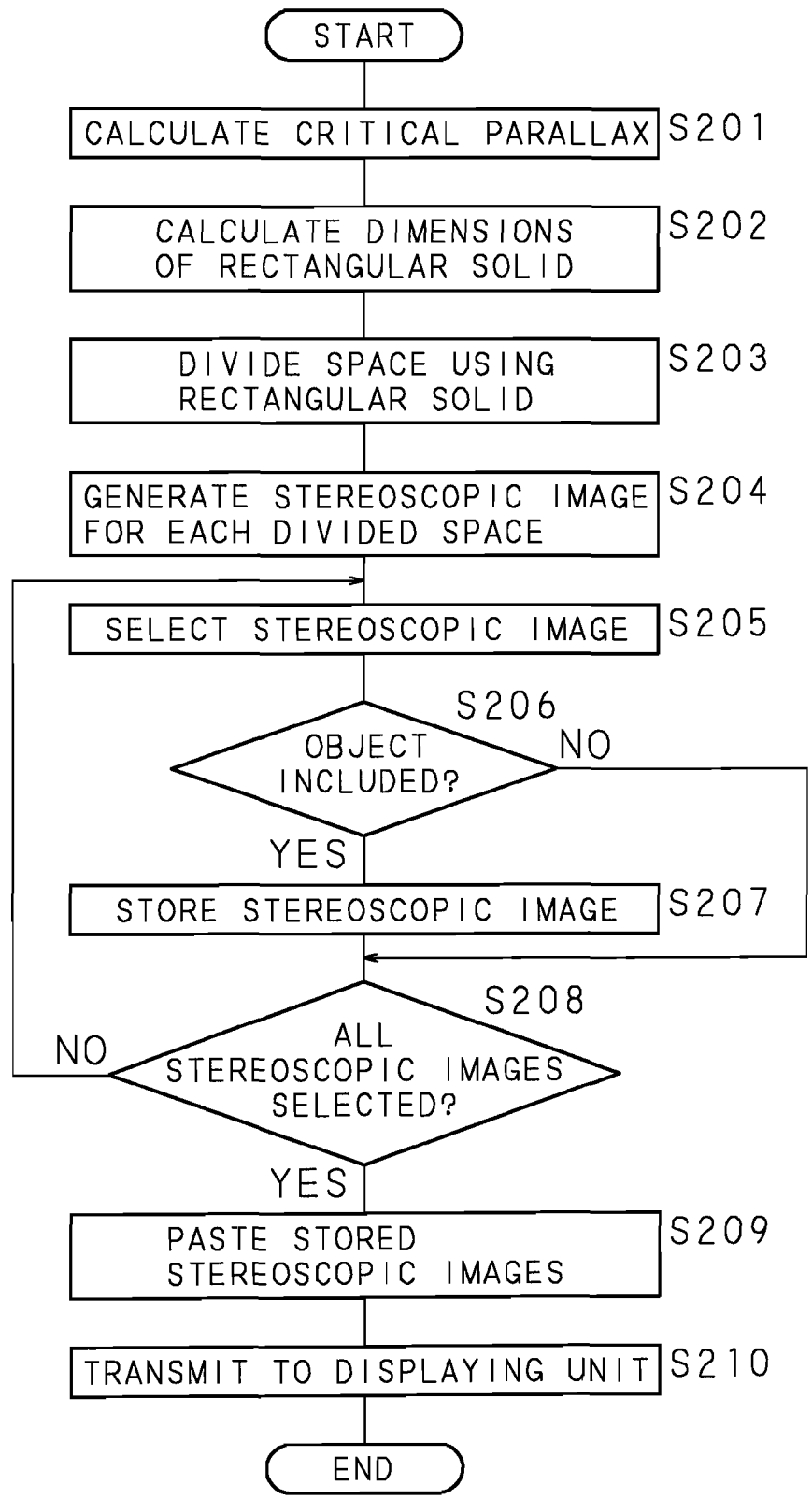
FIG. 2 is a flowchart showing the processing procedure of the CPU of the stereoscopic image display apparatus according to Embodiment 1 of the present invention.

FIG. 2 is a flowchart showing the processing procedure of the CPU 11 of the stereoscopic image display apparatus 10 according to Embodiment 1 of the present invention. The CPU 11 of the stereoscopic image display apparatus 10 first calculates a critical parallax that is the boundary of a parallax capable of forming a three-dimensional image on a retina of a viewer (at step S201)

The CPU 11 calculates the dimensions of a rectangular parallelepiped inscribing a sphere having a diameter equal to the calculated critical parallax (at step S202), reads the image data obtained by photographing an object from the image data storage section 121, and divides a space including the object into multiple spaces using the calculated rectangular parallelepiped (at step S203). The CPU 11 then generates a stereoscopic image of the object with respect to a single focus point for each divided space (at step S204).

The CPU 11 sequentially selects each stereoscopic image from among the multiple stereoscopic images (at step S205), and judges whether the object is included in the selected stereoscopic image (at step S206). When the CPU 11 judges that the object is included in the selected stereoscopic image (YES at step S206), the CPU 11 stores the selected stereoscopic image as a component for generating a whole stereoscopic image in the RAM 13 (at step S2207), and judges whether all the stereoscopic images have been selected or not (at step S208). When the CPU 11 judges that the object is not included in the selected stereoscopic image (NO at step S206), the CPU 11 skips to step S208 without storing the stereoscopic image in the RAM 13.

When the CPU 11 judges that all the stereoscopic images have not been selected (NO at step S208), the CPU 11 returns the processing to step S205, and the above-mentioned processing is executed repeatedly. When the CPU 11 judges that all the stereoscopic images have been selected (YES at step S208), the CPU 11 pastes the stored multiple stereoscopic images together (at step S209), and transmits a generated single stereoscopic image to the external large screen display unit 20 via the display interface 16 (at step S210).

FIG. 3 is a view illustrating a critical parallax. When a viewer sees an object, the rotation of the eye balls, the thickness adjustment of the crystalline lenses, etc. are performed so that the optical axes of the right and left eyes 31 and 32 intersect on the object. As a result, the distance L1 from the point at which the optical axes of the right and left eyes 31 and 32 intersect to the eyes 31 and 32 is changed, whereby the relationship between the distance L1 and the distance L2 from the screen or the like of the display unit 20 to which the object is projected to the eyes 31 and 32 is also changed.

In other words, when an image of a portion located at a value away from the focus point in the depth direction is viewed, the distance L1 and the distance L2 are not equal to each other, but have a considerable difference in distance therebetween. When this difference in distance becomes larger gradually and reaches a predetermined difference, the viewer recognizes that the image is "blurred." The parallax in the case of this difference in distance is defined as critical parallax.

Generally speaking, it is known that an image can be recognized as a stereoscopic image without any blurring in the case that the difference between the inverse of the distance L1 from the point at which the optical axes of the right and left eyes 31 and 32 intersect to the eyes 31 and 32 and the inverse of the distance L2 from a screen or the like to which the object is projected to the eyes 31 and 32 is within ±2. Hence, the critical parallax can be calculated according to the procedure described below.

Figure 4:
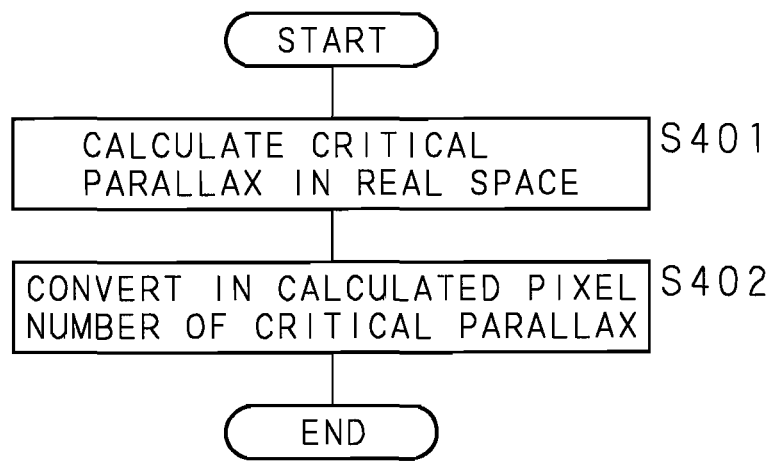
FIG. 4 is a flowchart showing a procedure for calculating the critical parallax using the CPU of the stereoscopic image display apparatus according to Embodiment 1 of the present invention.

FIG. 4 is a flowchart showing the detailed processing executed at step S201 by the CPU 11 of the stereoscopic image display apparatus 10 according to Embodiment 1 of the present invention, that is, a procedure for calculating the critical parallax. The CPU 11 of the stereoscopic image display apparatus 10 first calculates the critical parallax in a real space according to the procedure described below (at step S401).

Since the difference between the inverse of the distance L1 and the inverse of the distance L2 is within ±2, (Expression 1) is established between the distance L1 and the distance L2.

$$(1/L2-2) < 1/L1 < (1/L2+2) \quad \text{(Expression 1)}$$

In addition, since the triangle whose base is equal to the parallax d shown in FIG. 3 is similar to the triangle whose base is equal to the distance E between the two eyes, (Expression 2) is established.

$$L1 = L2 \times E/(d+E) \quad \text{(Expression 2)}$$

When (Expression 1) and (Expression 2) are arranged with respect to the parallax d, (Expression 3) can be derived. The absolute value of the parallax d at the boundary determining whether (Expression 3) is satisfied or not is the critical parallax D.

$$-2 \times L2 \times E < d < 2 \times L2 \times E \quad \text{(Expression 3)}$$

The CPU 11 calculates the number of pixels of the critical parallax D on the basis of the calculated critical parallax D, the horizontal width W of the screen of the large screen display unit 20 and the resolution R in the horizontal direction of the screen thereof (at step S402). In other words, the critical parallax D is converted into the number of pixels Q of the screen displaying the critical parallax D according to (Expression 4).

$$Q = D \times R/W \quad \text{(Expression 4)}$$

Since the critical parallax D is obtained using the number of pixels of the display on the display unit as described above, the viewer does not recognize that the image of the object is "blurred" inside a sphere centered at the focus point and having a diameter equal to the critical parallax D. This range is referred to as a stereoscopic limit. Accordingly, in Embodiment 1, a rectangular parallelepiped inscribing the stereoscopic limit is calculated, and a space including the object is divided using the obtained rectangular parallelepiped so that the space including the object can be divided without leaving any gaps.

Figure 5:
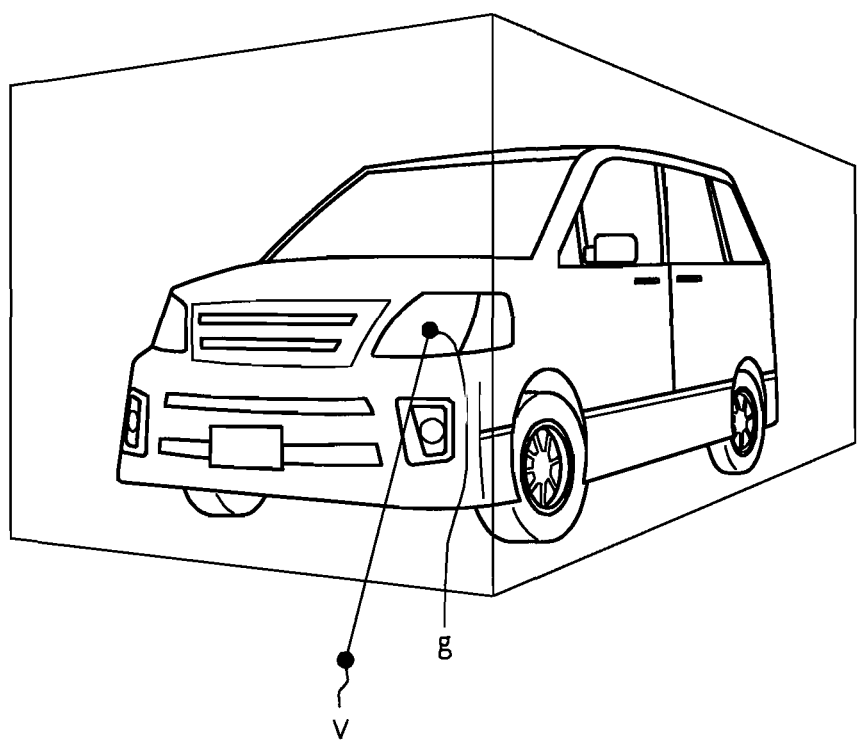
FIG. 5 is A view showing a focus point and a viewer's point that are set at desired positions in a space to determine the composition of the stereoscopic image of the image data stored in the image data storage section.

FIG. 5 is a view showing a focus point and a viewer's point that are set at desired positions inside a space to determine the composition of the stereoscopic image of image data stored in the image data storage section 121 of the storage means 12. In the example shown in FIG. 5, a focus point g is set near the gravity center of a vehicle serving as the object, and a viewer's point v is set at a position from which the focus point g is seen.

Furthermore, on the basis of the focus point g and the viewer's point v received, the CPU 11 determines a first rectangular parallelepiped that is used to divide the space.

Figure 6:
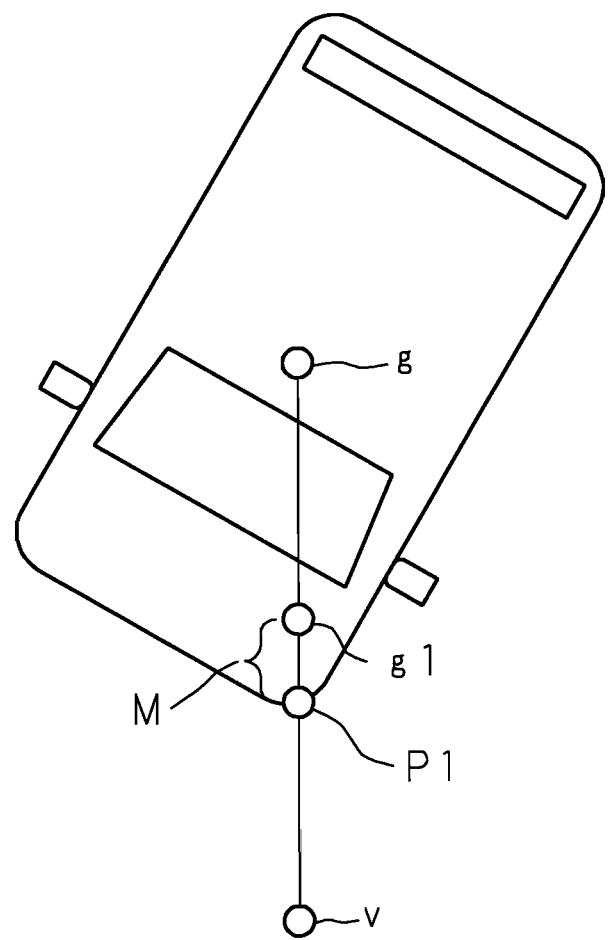
FIG. 6 is a view illustrating a method for obtaining a focus point of a divided space.

FIG. 6 is a view illustrating a method for obtaining the focus point g1 of a divided space. The intersection point P1 of the line segment connecting the focus point g to the viewer's point v and the surface of the object represented as a three-dimensional model is obtained. The point moved from the intersection point P1 toward the focus point g by a predetermined distance M along the line segment is obtained as the focus point g1 for a first divided space. The movement distance M is a distance obtained according to M=L×p ($0 \leq p \leq 1$) wherein a coefficient p is a parameter that is used to adjust an image near the intersection point P1.

Moreover, L is the depth of a rectangular parallelepiped around the focus point g1 of the first divided space and is calculated on the basis of the critical parallax D. The shape of the rectangular parallelepiped is adjusted by multiplying the critical parallax D by a shape parameter q ($0 \leq q \leq 1$). In other words, as q is larger, the depth becomes larger, and the height and width become smaller.

Figure 7:
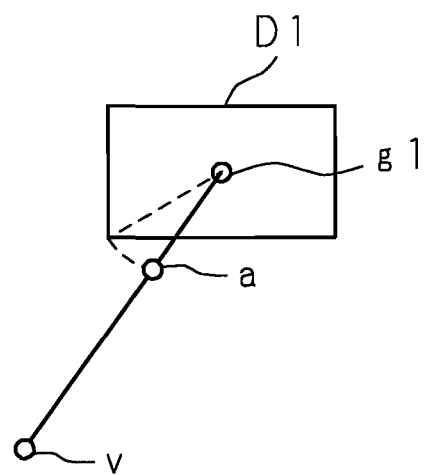
FIG. 7 is a schematic view showing a method for determining a first divided space.

The CPU 11 determines the coordinate of a given point a so that the parallax at the point a on the line segment connecting the viewer's point v to the focus point g1 of the first divided space does not exceed the value obtained by multiplying the critical parallax D by the shape parameter q. FIG. 7 is a schematic view showing a method for determining the first divided space. The CPU 11 determines the coordinate of the point a at which the parallax does not exceed the critical parallax D, in the depth direction from the v to the focus point g1 of the first divided space. Next, the CPU 11 determines a rectangle D1 so that the intersection point of the diagonal lines of the rectangle is aligned with the focus point g1 and so that half the length of the diagonal line is equal to the distance between the focus point g1 and the point a.

FIGS. 8(a) and 8(b) are schematic views showing a method for obtaining the height of a rectangular parallelepiped for the first divided space. As shown in FIG. 8(a), the CPU 11 determines the coordinate of a point b at which the parallax does not exceed the critical parallax D, on a straight line perpendicular to the plane including the rectangle D1. Next, as shown in FIG. 8(b), the CPU 11 determines a rectangular parallelepiped serving as the first divided space around the focus point g1, the base of which has the shape of the rectangle D1 and the height of which is twice the distance h between the points a and b.

After determining the depth, height and width of the rectangular parallelepiped being used for space dividing, the CPU 11 disposes the rectangular parallelepiped formed around the focus point g1 as a first divided space. FIG. 9 is a view showing a state in which the first divided space is disposed. As shown in FIG. 9, one rectangular parallelepiped serves as one divided space, and the center of the rectangular parallelepiped is the focus point g1 of the divided space. Furthermore, the CPU 11 sequentially disposes the rectangular parallelepipeds so that they are adjacent to the rectangular parallelepiped serving as the first divided space in the up-down/right-left/front-rear directions.

Figure 10:
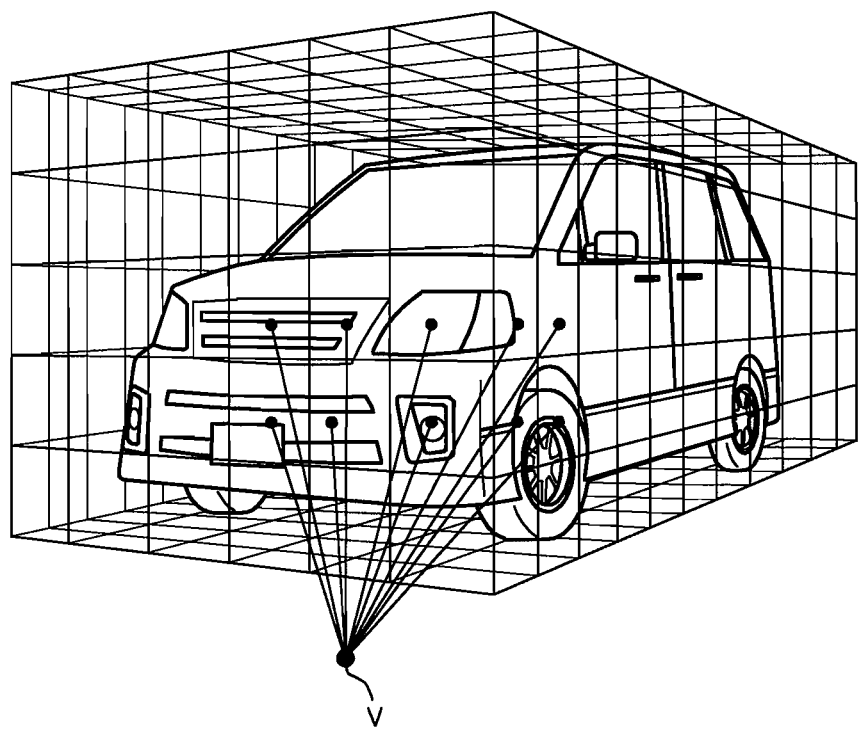
FIG. 10 is a view showing a state in which rectangular parallelepipeds are disposed as the divided spaces of an object.

FIG. 10 is a view showing a state in which rectangular parallelepipeds are disposed as the divided spaces of an object. As shown in FIG. 10, the CPU 11 sequentially dispose the rectangular parallelepipeds until the three-dimensional model showing the object is not included in the rectangular parallelepipeds. With this disposition, the parallax of the image of the three-dimensional model included in each rectangular parallelepiped does not exceed the apex b shown in FIG. 8(a). This is because the rectangular parallelepiped to be disposed becomes smaller in a stereoscopic image as it is away from the first rectangular parallelepiped.

When generating a stereoscopic image for each divided space as described above, the CPU 11 fixes the viewer's point v and generates stereoscopic images corresponding to the focus points g1, g2, . . . , gn (n: a natural number) of the respective rectangular parallelepipeds serving as the divided spaces in a way similar to the conventional method.

Figure 11:
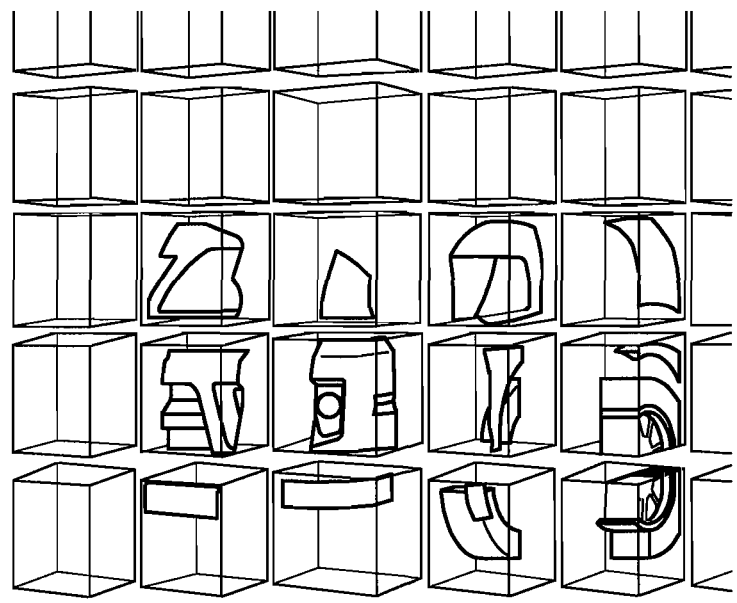
FIG. 11 is a view showing examples of stereoscopic images generated in the first row.

The stereoscopic images are generated sequentially beginning with a divided space near the viewer's point v. For example, when the rectangular parallelepipeds are disposed in m rows (m: a natural number) in the depth direction as shown in FIG. 10, the CPU 11 sequentially generates stereoscopic images beginning with the first row. In the case that the stereoscopic images of the second, third, . . . , kth (k: a natural number, $1 \leq k \leq m$) rows are generated, and when divided spaces are concealed completely from the viewer's point v by the stereoscopic images generated earlier, that is, by the stereoscopic images in the first to the (k−1)th rows, the generation of the stereoscopic images for the divided spaces is skipped. FIG. 11 is a view showing examples of stereoscopic images generated in the first row. As described above, stereoscopic images that can be seen from the viewer's point v by the viewer are generated sequentially, and these images are pasted together. Hence, the viewer can recognize the obtained image as a three-dimensional image regardless of which part of the image displayed on a large screen is viewed by the viewer.

Figure 12:
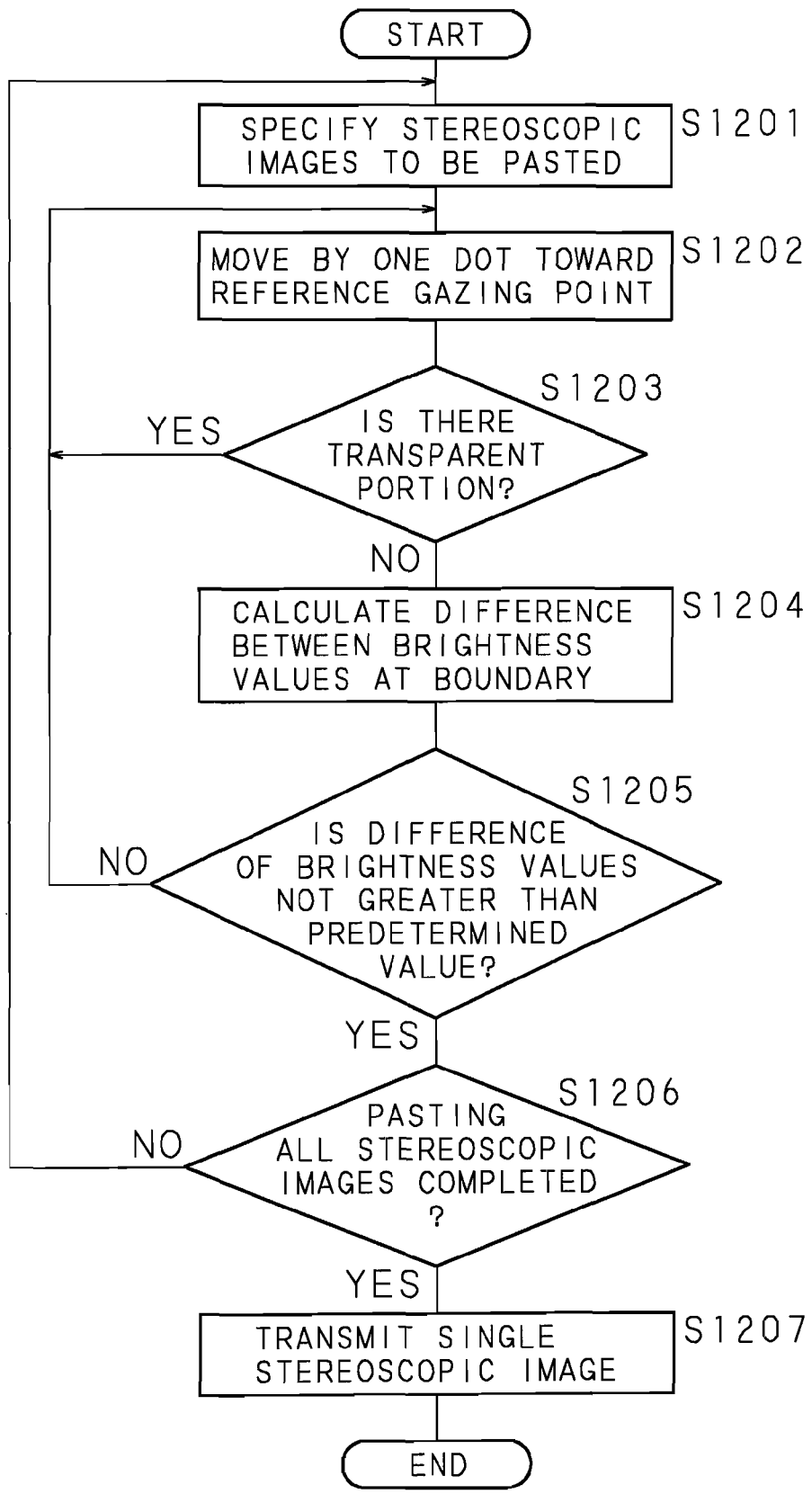
FIG. 12 is a flowchart showing the stereoscopic image pasting processing of the CPU of the stereoscopic image display apparatus according to Embodiment 1 of the present invention.

However, if the stereoscopic images are simply pasted together, transparent gap portions are generated at the boundaries of the divided spaces, and an unnatural three-dimensional image is obtained. To solve this problem, the CPU 11 moves, from a divided space, another divided space adjacent thereto dot by dot so that transparent gap portions are eliminated at the boundaries. FIG. 12 is a flowchart showing the stereoscopic image pasting processing of the CPU 11 of the stereoscopic image display apparatus 10 according to Embodiment 1 of the present invention.

From among the generated multiple stereoscopic images, the CPU 11 of the stereoscopic image display apparatus 10 specifies a stereoscopic image to be used as a reference for the pasting processing and a stereoscopic image to be adjusted (at step S1201). Generally speaking, the stereoscopic image to be used as the reference is moved sequentially from the stereoscopic image corresponding to the rectangular, parallelepiped of the first divided space to the stereoscopic image subjected to the pasting processing.

The CPU 11 moves the stereoscopic image to be adjusted toward the focus point of the stereoscopic image to be used as the reference (reference focus point) by one dot (at step S1202), and judges beforehand whether a point having a brightness value registered as a background color, that is, a transparent portion through which the background can be seen is present or not (at step S1203). FIG. 13 is a schematic view showing a state in which the stereoscopic image to be adjusted is moved dot by dot. In FIG. 13, a stereoscopic image 62 to be adjusted is moved dot by dot toward the viewer's point (reference focus point) g of a stereoscopic image 61 to be used as the reference, whereby the background color portion being present between the stereoscopic image 61 to be used as the reference and the stereoscopic image 62 to be adjusted, that is, a transparent portion 63, is eliminated.

When the CPU 11 judges that a transparent portion is present (YES at step S1203), the CPU 11 returns the processing to step S1202 and moves the stereoscopic image to be adjusted repeatedly dot by dot to carry out approaching. When the CPU 11 judges that no transparent portion is present (NO at step S1203), the CPU 11 calculates the difference between the brightness values at the boundary (at step S1204), and judges whether the difference between the brightness values is a predetermined value or less (at step S1205).

When the CPU 11 judges that the difference between the brightness values is not the predetermined value or less (NO at step S1205), the CPU 11 returns the processing to step S1202, and executes the above-mentioned processing repeatedly. When the CPU 11 judges that the difference between the brightness values is the predetermined value or less (YES at step S1205), the CPU 11 judges whether the pasting processing for all the stereoscopic images has been completed or not (at step S1206).

When the CPU 11 judges that the pasting processing for all the stereoscopic images has been completed (YES at step S1206), the CPU 11 transmits a generated stereoscopic image to the large screen display unit 20 via the display interface 16 (at step S1207). When the CPU 11 judges that the pasting processing for all the stereoscopic images has not been completed (NO at step S1206), the CPU 11 returns the processing to step S1201, and executes the above-mentioned processing repeatedly.

In the above-mentioned processing, the relative position of the stereoscopic image to be adjusted in the pasting processing with respect to the stereoscopic image to be used as the reference is determined depending on whether the difference between the brightness values at the boundary is the predetermined value or less. However, it may be possible that the differences between all the brightness values in a certain range are calculated and that the position at which the difference between the brightness values is minimal is used as the relative position of the stereoscopic image to be adjusted with respect to the stereoscopic image to be used as the reference. With this configuration, the gap portion, such as a transparent portion being generated at the boundary of the adjacent stereoscopic images when the stereoscopic images are simply pasted at their original space positions, can be eliminated more effectively. Hence, it is possible to generate a stereoscopic image that can form a natural three-dimensional image on a retina of the viewer even at the boundary portion.

As described above, in Embodiment 1, a space is divided using a rectangular parallelepiped within the range of the parallax wherein the viewer does not recognize an image as a blurred image, a stereoscopic image is generated for each divided space in a way similar to the conventional method, and then these images are pasted together to generate a stereoscopic image. Hence, the generated stereoscopic image is a stereoscopic image within the range of the critical parallax in any regions thereof, and no blurred three-dimensional image is formed on a retina even if the stereoscopic image is viewed by the viewer from any positions and any angles.

Hence, all the regions of the stereoscopic image can be visually recognized accurately without using varifocal lenses, and the spatial positional relationship of the object can be grasped accurately. In addition, since image generation can be done simply by pasting only the stereoscopic images each generated in a space having the shape of a rectangular parallelepiped in which the object is present. As a result, the load for computer processing can be decreased significantly, and the cost for computation can be reduced.

Embodiment 2

Figure 14:
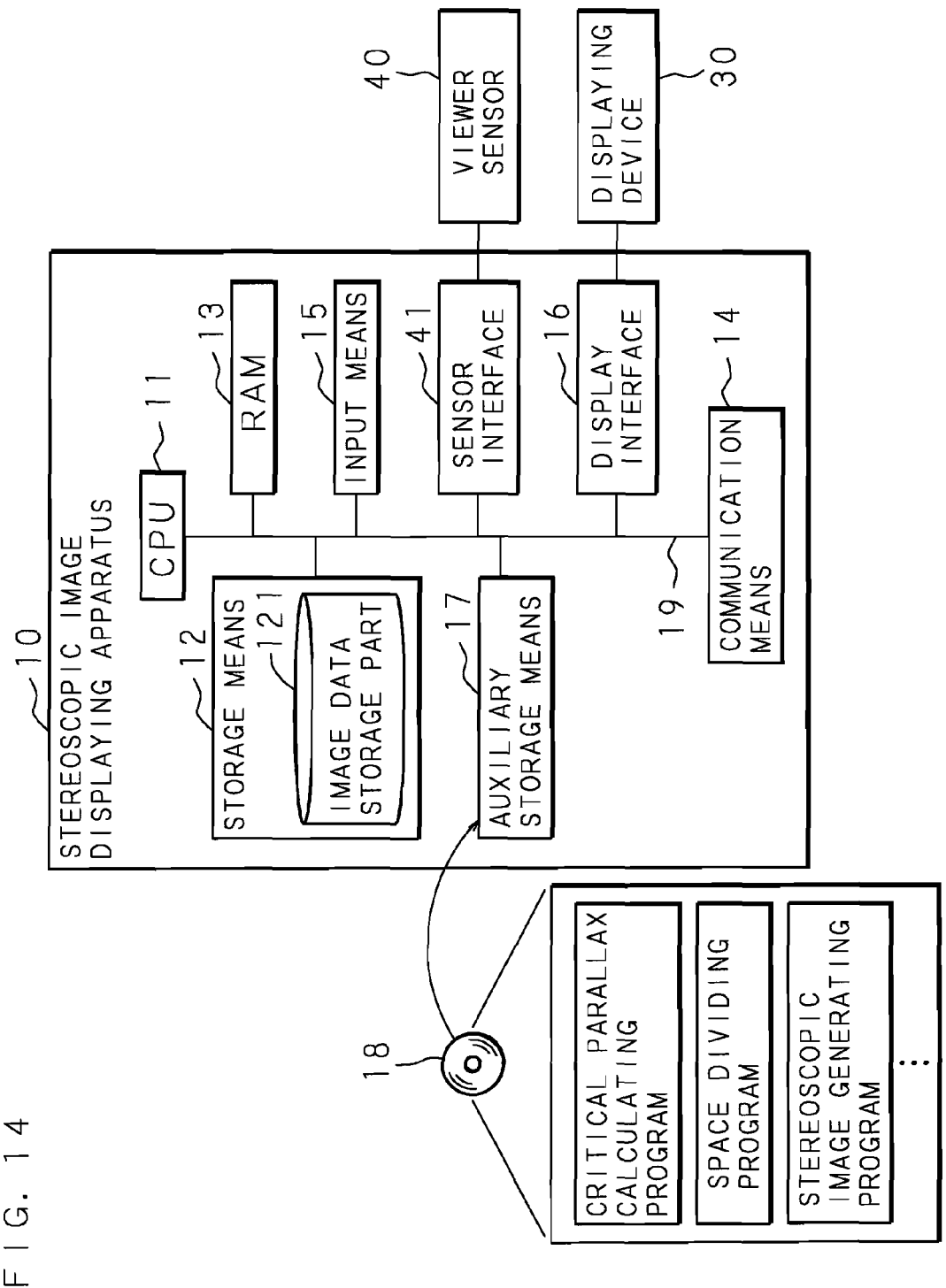
FIG. 14 is a block diagram showing the configuration of a stereoscopic image display apparatus according to Embodiment 2 of the present invention.

A stereoscopic image display apparatus according to Embodiment 2 of the present invention will be described below specifically on the basis of the drawings. FIG. 14 is a block diagram showing the configuration of the stereoscopic image display apparatus 10 according to Embodiment 2 of the present invention. As shown in FIG. 14, since the configuration of the stereoscopic image display apparatus 10 according to Embodiment 2 of the present invention is similar to that according to Embodiment 1, similar components are designated by the same numerals, and their detailed descriptions are omitted. Embodiment 2 is characterized in that a stereoscopic image is transmitted to an external display unit 30 that can be seen by a single viewer instead of the large screen display unit 20 that can be seen by numerous viewers, and that the critical parallax being used as the reference for generating the stereoscopic image is corrected on the basis of the distance to the screen from the viewer detected using a viewer sensor 40, the distance between the eyes of the viewer, etc.

The input means 15 is a pointing device, such as a mouse, for indicating a position on the screen or a keyboard for key entering numeric data, such as the horizontal width of the screen on the screen.

The display interface 16 is an LSI board for transmitting display data to the external display unit 30, such as a liquid crystal display device (LCD) or a display device (CRT), for displaying images.

The sensor interface 41 transmits the signal detected using the viewer sensor 40 disposed externally to the CPU 11. The sensor interface 41 is, for example, an optical sensor, a supersonic sensor or the like installed above the screen of the display unit 30, and the CPU 11 calculates the distance to the viewer, the distance between the eyes of the viewer, etc. on the basis of the obtained detection signal.

Generally speaking, it is known that an image can be recognized as a stereoscopic image without any blurring in the case that the difference between the inverse of the distance L1 from the point at which the optical axes of the right and left eyes 31 and 32 intersect to the eyes 31 and 32 and the inverse of the distance L2 from a screen or the like to which the object is projected to the eyes 31 and 32 is within ±2. However, it is assumed that the value of the difference may vary depending on personal characteristics, such as differences in the distance of the viewer to the display screen and in the distance between the eyes of the viewer Hence, in Embodiment 2, to absorb the variation in the above-mentioned allowable limit, the CPU 11 calculates the allowable difference Z between the inverse of the distance L1 and the inverse of the distance L2 using the distance to the viewer, the distance between the eyes of the viewer, etc. calculated on the basis of the signal detected using the viewer sensor 40.

Figure 15:
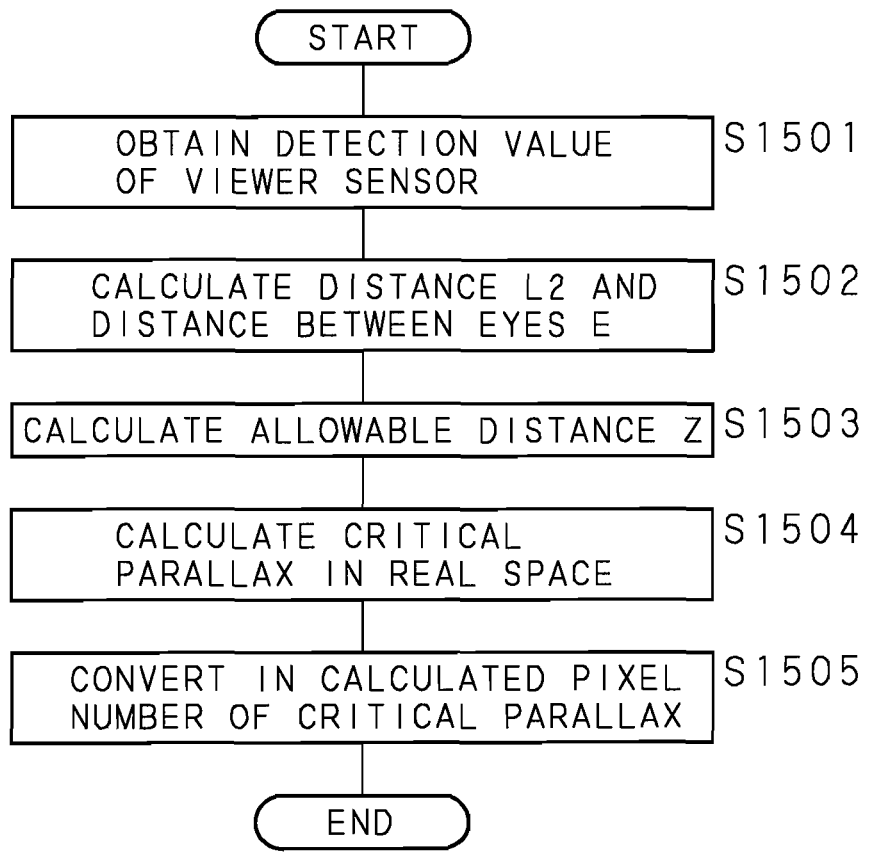
FIG. 15 is a flowchart showing a procedure for calculating the critical parallax using the CPU of the stereoscopic image display apparatus according to Embodiment 2 of the present invention.
Figure 17:
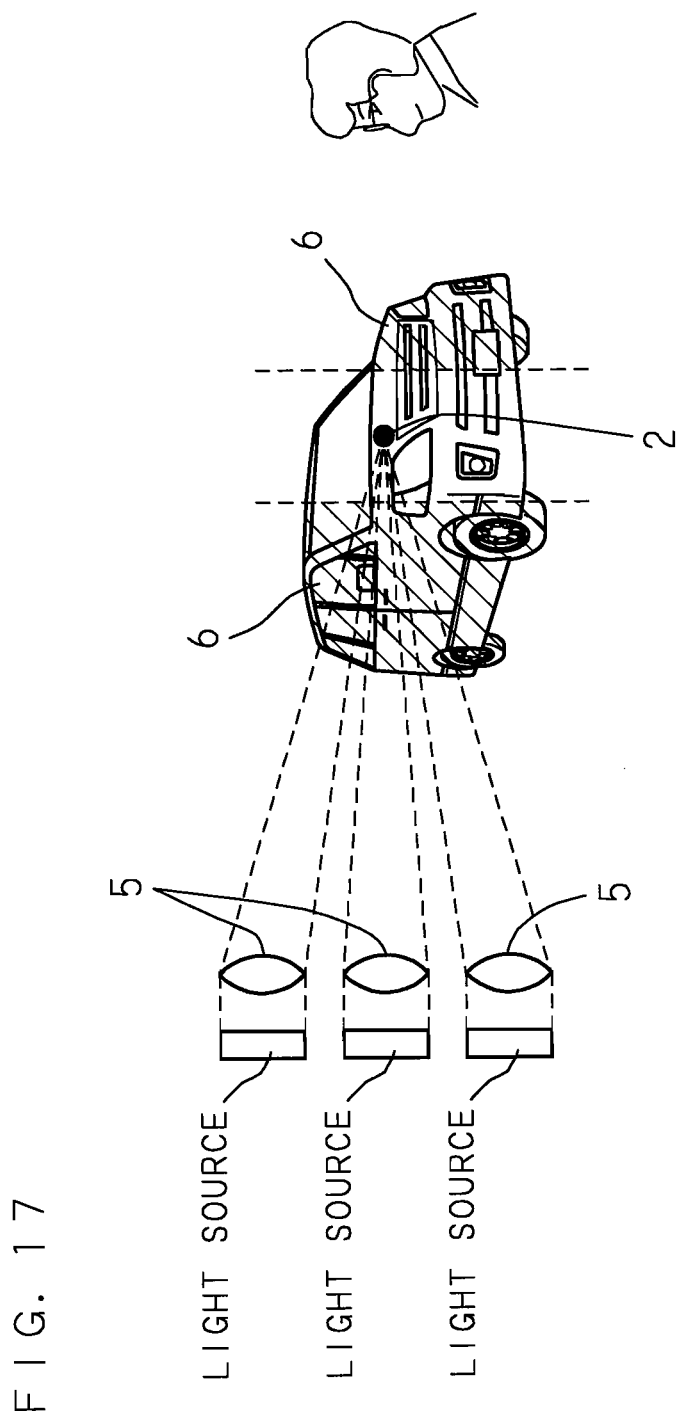
FIG. 17 is a view showing regions in which image blurring occurs in the conventional stereoscopic image display system.

FIG. 15 is a flowchart showing a procedure for calculating a critical parallax using the CPU 11 of the stereoscopic image display apparatus 10 according to Embodiment 2 of the present invention. The CPU 11 of the stereoscopic image display apparatus 10 obtains the detection signal detected using the viewer sensor 40 (at step S1501), and calculates the distance L2 from the screen or the like of the display unit 20 to which an object is projected to the eyes 31 and 32, the distance E between the eyes of the viewer, etc. (at step 1502).

The CPU 11 calculates the allowable difference Z between the inverse of the distance L1 and the inverse of the distance L2 (at step 1503), and calculates the critical parallax in a real space according to the procedure described below (at step 1504). Since the difference between the inverse of the distance L1 and the inverse of the distance L2 is within ±Z, (Expression 5) is established between the distance L1 and the distance L2, $$(1/L2 - Z) < 1/L1 < (1/L2 + Z) \qquad \text{(Expression 5)}$$

In addition, since the triangle whose base is equal to the parallax d shown in FIG. 3 is similar to the triangle whose base is equal to the distance E between the two eyes, (Expression 6) is established.

$$L1 = L2 \times E/(d+E) \qquad \text{(Expression 6)}$$

When (Expression 5) and (Expression 6) are arranged with respect to the parallax d, (Expression 7) can be derived. The absolute value of the parallax d at the boundary determining whether (Expression 7) is satisfied or not is the critical parallax D.

$$-Z \times L2 \times E < d < Z \times L2 \times E \qquad \text{(Expression 7)}$$

However, there are differences among individuals in the range in which image blurring occurs depending on the personal characteristics of the viewer, such as focusing in front of or behind the retina position due to nearsightedness or farsightedness or the presence or absence of dirt on the crystalline lens. A coefficient for correcting the critical parallax D so as to be more adapted to the personal characteristics of the viewer is set via the input means 15. As a result, it is possible to generate a stereoscopic image more adapted to the viewer.

The CPU 11 calculates the number of pixels of the critical parallax D on the basis of the calculated critical parallax D, the horizontal width W of the screen of the display unit 30 and the resolution R in the horizontal direction of the screen thereof (at step S1505). In other words, the critical parallax D is converted into the number of pixels Q of the screen displaying the critical parallax D according to (Expression 8).

$$Q = D \times R/W \qquad \text{(Expression 8)}$$

Since the critical parallax D is obtained as the number of pixels of the display on the display unit as described above, the viewer does not recognize that the image of the object is "blurred" in a sphere centered at the focus point and having a diameter equal to the critical parallax D. This range is referred to as a stereoscopic limit. Accordingly, in Embodiment 1, a rectangular parallelepiped inscribing the stereoscopic limit is calculated, and a space including the object is divided using the obtained rectangular parallelepiped so that the space including the object can be divided without leaving any gaps.

Then, as in Embodiment 1, a stereoscopic image is generated for each divided space, and the generated multiple stereoscopic images are pasted together to generate a single stereoscopic image. Hence, it is possible to view an accurate stereoscopic image regardless of, for example, the viewing posture, the viewing direction, etc. of the viewer.

According to Embodiment 2 described above, the critical parallax can be calculated accurately depending on the viewing position of the viewer, whereby it is possible to display a stereoscopic image adapted to the viewer. Furthermore, the calculated critical parallax is corrected depending on the personal characteristics of the viewer, such as focusing in front of or behind the retina position due to nearsightedness or farsightedness or the presence or absence of dirt on the crystalline lens, whereby the critical parallax can be calculated more accurately, and it is possible to display a stereoscopic image more adapted to the viewer.

As this description may be embodied in several forms without departing from the spirit of essential characteristics thereof, the present embodiments are therefore illustrative and not restrictive, since the scope is defined by the appended claims rather than by description preceding them, and all changes that fall within metes and bounds of the claims, or equivalence of such metes and bounds thereof are therefore intended to be embraced by the claims.

What is claimed is:

1. A stereoscopic image display apparatus for generating and displaying a stereoscopic image that forms a three-dimensional image comprising:
    a viewer's point setting unit that sets a point of view of a viewer seeing an object of a size greater than a critical parallax boundary;
    a critical parallax calculating unit that calculates a critical parallax that is the boundary of a parallax capable of forming a three-dimensional image which is in focus on a retina of the viewer from the point of view of the viewer;
    a rectangular parallelepiped dimension calculating unit that calculates the dimensions of a rectangular parallelepiped inscribing a sphere having a diameter equal to the calculated critical parallax;
    an estimating unit that estimates a space using the calculated rectangular parallelepiped and including the object;
    a space dividing unit divides the estimated space into multiple spaces based on the calculated rectangular parallelepiped and disposes those spaces until the object is not included therein;
    a focus point setting unit that sets focus points for the multiple spaces, respectively;
    a focus image generating unit that generates a stereoscopic image for the each of the multiple spaces, with respect to the point of view of the viewer and the focus point;
    a focus image pasting unit that pastes the generated multiple stereoscopic images together to generate a single stereoscopic image, said focus point image pasting unit comprises:
        a unit for calculating the brightness difference by using one space of the divided spaces as a reference, calculating the difference between the brightness value of a stereoscopic image generated in said one space and the brightness value of a stereoscopic image generated in another space adjacent thereto,
        a unit for moving the other space in parallel with said one space and for recalculating the brightness difference; and
        a unit for obtaining the relative position of the other space with respect to said one space, at which the calculated brightness difference becomes minimal; and
    an image displaying unit that displays the generated single stereoscopic image.

2. The stereoscopic image display apparatus as set forth in claim 1, further comprising a relative position detecting unit for detecting the relative position between the screen on which a stereoscopic image is displayed and the viewer,
    wherein said critical parallax is calculated as a parallax in which the difference between the inverse of the distance from the point at which the optical axes of the right and left eyes intersect to the eyes, and the inverse of the distance from the screen on which the stereoscopic image is displayed to the eyes has a predetermined value.

3. The stereoscopic image display apparatus as set forth in claim 2, wherein the predetermined value is set to assure the image is not out of focus and is ±2.

4. The stereoscopic image display apparatus as set forth in claim 3, wherein for a display with a horizontal width D having Q pixels, and a resolution in the horizontal direction R, the critical parallax to assure the image is not out of focus satisfies the relationship Q=D×R/W.

5. The stereoscopic image display apparatus as set forth in claim 1, wherein said critical parallax calculating unit is equipped with a correcting unit for correcting said critical parallax on the basis of the personal characteristics of the viewer.

6. A stereoscopic image displaying method for generating and displaying a stereoscopic image that forms a three-dimensional image, comprising the steps of:
setting a viewer's point of view seeing an object of a size greater than a critical parallax boundary with a viewer's point setting unit;
calculating a critical parallax that is the boundary of a parallax capable of forming a three-dimensional image which is in focus on a retina of the viewer from the point of view of the viewer;
calculating the dimensions of a rectangular parallelepiped inscribing a sphere having a diameter equal to the calculated critical parallax;
estimating a space using the calculated rectangular parallelepiped and including the object using an estimating unit;
dividing a space into multiple spaces based on the calculated rectangular parallelepiped and disposes those spaces until the object is not included therein;
setting focus points for the multiple spaces, respectively, using a focus point setting unit;
generating a stereoscopic image of the object with respect to a single focus for each divided space;
pasting the generated multiple stereoscopic images together to generate a single stereoscopic image;
calculating the brightness difference by using one space of the divided spaces as a reference, calculating the difference between the brightness value of a stereoscopic image generated in said one space and the brightness value of a stereoscopic image generated in another space adjacent thereto;
moving the other space in parallel with said one space and recalculating the brightness difference;
obtaining the relative position of the other space with respect to said one space, at which the calculated brightness difference becomes minimal; and
displaying the generated single stereoscopic image.

7. The stereoscopic image displaying method as set forth in claim 6, comprising:
detecting the relative position between the screen on which a stereoscopic image is displayed and the viewer, wherein said critical parallax is calculated as a parallax in which the difference between the inverse of the distance from the point at which the optical axes of the right and left eyes intersect to the eyes and the inverse of the distance from the screen on which the stereoscopic image is displayed to the eyes has a predetermined value.

8. The stereoscopic image displaying method as set forth in claim 7, wherein the predetermined value is set to assure that the image is not out of focus and is ±2.

9. The stereoscopic image displaying method as set forth in claim 8, wherein for a display with a horizontal width D having Q pixels, and a resolution in the horizontal direction R, the critical parallax D to assure the image is not out of focus satisfies the relationship $Q=D \times R/W$.

10. The stereoscopic image displaying method as set forth in claim 6, wherein said critical parallax is corrected on the basis of the personal characteristics of the viewer.

11. A computer program product stored on a non-transitory computer readable medium for controlling a computer that generates and displays a stereoscopic image that forms a three-dimensional image on a retina of a viewer, said computer being operated to function as:
a viewer's point setting unit for setting a point of view of a viewer seeing an object a size greater than a critical parallax boundary;
critical parallax calculating means for calculating a critical parallax that is the boundary of a parallax capable of forming a three-dimensional image which is in focus on a retina of the viewer from the point of view of the viewer;
rectangular parallelepiped dimension calculating means for calculating the dimensions of a rectangular parallelepiped inscribing a sphere having a diameter equal to the calculated critical parallax;
an estimating unit for estimating a space using the calculated rectangular parallelepiped and including the object;
space dividing means for dividing the estimated space into multiple spaces_based on the calculated rectangular parallelepiped and disposes those spaces until the object is not included therein;
a focus point setting unit for setting focus points for the multiple spaces, respectively;
a focus image generating means for generating a stereoscopic image for the each of the multiple spaces, with respect to the point of view of the viewer and the focus point;
a focus image pasting means for pasting the generated multiple stereoscopic images together to generate a single stereoscopic image;
a means for calculating the brightness difference by using one space of the divided spaces as a reference, and calculating the difference between the brightness value of a stereoscopic image generated in said one space and the brightness value of a stereoscopic image generated in another space adjacent thereto;
means for moving the other space in parallel with said one space and for recalculating the brightness difference; and
means for obtaining the relative position of the other space with respect to said one space, at which the calculated brightness difference becomes minimal; and
an image displaying means for displaying the generated single stereoscopic image.

12. The computer program product as set forth in claim 11, wherein said computer is operated:
to function as relative position detecting means for detecting the relative position between the screen on which a stereoscopic image is displayed and the viewer, and to function such that said critical parallax is calculated as a parallax in which the difference between the inverse of the distance from the point at which the optical axes of the right and left eyes intersect to the eyes and the inverse of the distance from the screen on which the stereoscopic image is displayed to the eyes has a predetermined value.

13. The computer program product as set forth in claim 12, wherein the predetermined value is set to assure the image is not out of focus and is ±2.

14. The computer program product as set forth in claim 13, wherein for a display with a horizontal width D having Q pixels, and a resolution in the horizontal direction R, the critical parallax to assure the image is not out of focus satisfies the relationship $Q=D \times R/W$.

15. The computer program product as set forth in claim 11, wherein said computer is operated to function as correcting means for correcting said critical parallax on the basis of the personal characteristics of the viewer.

* * * * *